US012235116B2

(12) United States Patent
Mutangana et al.

(10) Patent No.: US 12,235,116 B2
(45) Date of Patent: Feb. 25, 2025

(54) AUTONOMOUS MANAGEMENT OF WIRELESS CONNECTIVITY OF PRIORITY RESPONSE VEHICLES

(71) Applicant: FORD GLOBAL TECHNOLOGIES, LLC, Dearborn, MI (US)

(72) Inventors: Jean de Dieu Mutangana, Detroit, MI (US); Mohsen Bahrami, Birmingham, MI (US); Hamed Asadi, Troy, MI (US); James Wilhelm Heaton, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 251 days.

(21) Appl. No.: 17/823,989

(22) Filed: Sep. 1, 2022

(65) Prior Publication Data
US 2024/0077319 A1     Mar. 7, 2024

(51) Int. Cl.
*G01C 21/34*     (2006.01)
*H04W 72/56*     (2023.01)
*H04W 76/50*     (2018.01)

(52) U.S. Cl.
CPC ........ *G01C 21/3453* (2013.01); *H04W 72/56* (2023.01); *H04W 76/50* (2018.02)

(58) Field of Classification Search
CPC ... G01C 21/3453; H04W 76/50; H04W 72/56
See application file for complete search history.

(56) References Cited

U.S. PATENT DOCUMENTS

| | | | |
|---|---|---|---|
| 9,326,209 B2 * | 4/2016 | Huang | H04W 36/22 |
| 10,540,598 B2 | 1/2020 | Wasserkrug et al. | |
| 2011/0235627 A1 * | 9/2011 | Wang | H04L 63/0428 370/338 |
| 2017/0142757 A1 | 5/2017 | McKibben et al. | |
| 2019/0219688 A1 * | 7/2019 | Liu | G01S 13/89 |
| 2020/0252773 A1 * | 8/2020 | Jagannatha | H04L 65/80 |
| 2021/0114616 A1 * | 4/2021 | Altman | G01C 21/3889 |
| 2023/0074288 A1 * | 3/2023 | Filippou | H04W 28/0236 |

FOREIGN PATENT DOCUMENTS

WO     2016139266 A1     9/2016

* cited by examiner

*Primary Examiner* — Seth A Silverman
(74) *Attorney, Agent, or Firm* — Joseph Zane; Brooks Kushman P.C.

(57) ABSTRACT

Autonomous management of wireless connectivity of priority response vehicles is provided. It is received, from a communications network including a plurality of access points, the access points configured to provide communications services to priority vehicles and non-priority vehicles, locations of the priority vehicles over the communications network. A SON server is utilized, in communication with the plurality of access points, to optimize wireless connectivity for the priority vehicles. It is received, by an enhanced vehicle management system (EVMS) server, in communication with the SON server, network quality information from the SON server. The priority vehicles are routed based on the network quality information.

18 Claims, 7 Drawing Sheets

AUTONOMOUS MANAGEMENT OF WIRELESS CONNECTIVITY OF PRIORITY RESPONSE VEHICLES

TECHNICAL FIELD

Aspects of the disclosure relate to autonomous management of wireless connectivity of priority response vehicles.

BACKGROUND

As modern cities get more and more crowded and congested, it becomes difficult for priority response vehicles (e.g., police vehicles, ambulances, firefighter vehicles, etc.) to render service in a timely manner. This delay may be attributed to factors such as physical lane traffic, network congestion, and signal disruption due to traffic and mobility data. For lane traffic, priority responders may augment their services using air travel. However, it may be desirable to maintain uninterrupted connectivity with the priority vehicles. For example, the connectivity to be maintained may be between two or more priority response vehicles dispatched to serve the same scene. Additionally, or alternatively, the connectivity to be maintained may be between the priority response vehicles and a call center instructing the vehicles.

SUMMARY

In one or more illustrative examples, a system for autonomous management of wireless connectivity of priority response vehicles is provided. The system includes a plurality of access points to a communications network. The access points are configured to provide communications services to priority vehicles and non-priority vehicles. The system also includes a self-organizing network (SON) server, in communication with the plurality of access points, programmed to provide self-healing, self-configuration, and self-optimization services to the communications network. The system also includes an enhanced vehicle management system (EVMS) server, in communication with the SON server. The EVMS server is configured to receive locations of the priority vehicles over the communications network, utilize the SON server to optimize wireless connectivity for the priority vehicles, receive network quality information from the SON server, and route the priority vehicles based on the network quality information.

In one or more illustrative examples, a method for autonomous management of wireless connectivity of priority response vehicles is provided. It is received, from a communications network including a plurality of access points, the access points configured to provide communications services to priority vehicles and non-priority vehicles, locations of the priority vehicles over the communications network. A SON server is utilized, in communication with the plurality of access points, to optimize wireless connectivity for the priority vehicles. It is received, by an EVMS server, in communication with the SON server, network quality information from the SON server. The priority vehicles are routed based on the network quality information.

In one or more illustrative examples, a non-transitory computer-readable medium comprising instruction for autonomous management of wireless connectivity of priority response vehicles, that when executed by one or more computing devices, cause the one or more computing devices to perform operations including to receive, from a communications network including a plurality of access points, the access points configured to provide communications services to priority vehicles and non-priority vehicles, locations of the priority vehicles over the communications network; utilize a SON server, in communication with the plurality of access points, to optimize wireless connectivity for the priority vehicles; receive, by an EVMS server, in communication with the SON server, network quality information from the SON server; and route the priority vehicles based on the network quality information, including to send a dispatch request to a priority vehicle, requesting the priority vehicle to move from a current location of the priority vehicle to a destination location, assign a network quality score as weights to each segment of roadway according to the network quality information, find a lowest total route accounting for the weights from the current location of the vehicle to the destination location, thereby allowing for the priority vehicle to circumvent areas of poor network quality, and send the route to the priority vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A source of wireless network connectivity for the priority vehicles may be one of the locally available radio access technologies (RATs) such as cellular service (e.g., 4G LTE, 5G, or beyond), Wi-Fi, private LTE (also known as Citizen Broadband Radio Service (CBRS)), or the more recent private 5G. This connectivity may also be served from a nationally dedicated response network such as FirstNet (sometimes referred to as First Responder Network Authority).

At any given instant or location, the RAT serving the vehicle may fall out of service or be inaccessible. This drop is service may occur due to various causes, such as a local power outage, a malfunction, network congestion, or other network issues. The other network issues may include fading due to radio frequency (RF) signal blockage caused by presence of many smart devices, sensors, and smart city buildings blocking the RF signal's travel path from the transmitter to the intended receiver. The lack of service may also result from power dissipation to a level below a desired signal detection energy threshold caused by the received signal's traveled distance from the RAT to the vehicle or vice-versa. Moreover, signal impediment may be due to the presence of inter-RAT or intra-RAT interference, or just a power down state of one of the RATs due unforeseen events. Some of these signal quality-hindering causes may simultaneously occur. To maintain the wireless signal connectivity for priority vehicles with little to no interruption, it remains imperative to design robust and intelligent methods for wireless radio resource management (RRM) and radio resource optimization (RRO).

A practical framework is presented in which wireless radio access points for radio resource vehicles may be maintained in a self-organizing manner under the direction of a SON server. The SON server may support self-healing, self-configuration, and self-optimization in a communications network. Additionally, an EVMS may be implemented to address network quality conditions for the vehicles. RRM and RRO may be possible via the EVMS to autonomously control and optimize wireless connectivity for priority vehicles or priority vehicle clusters.

Figure 1:
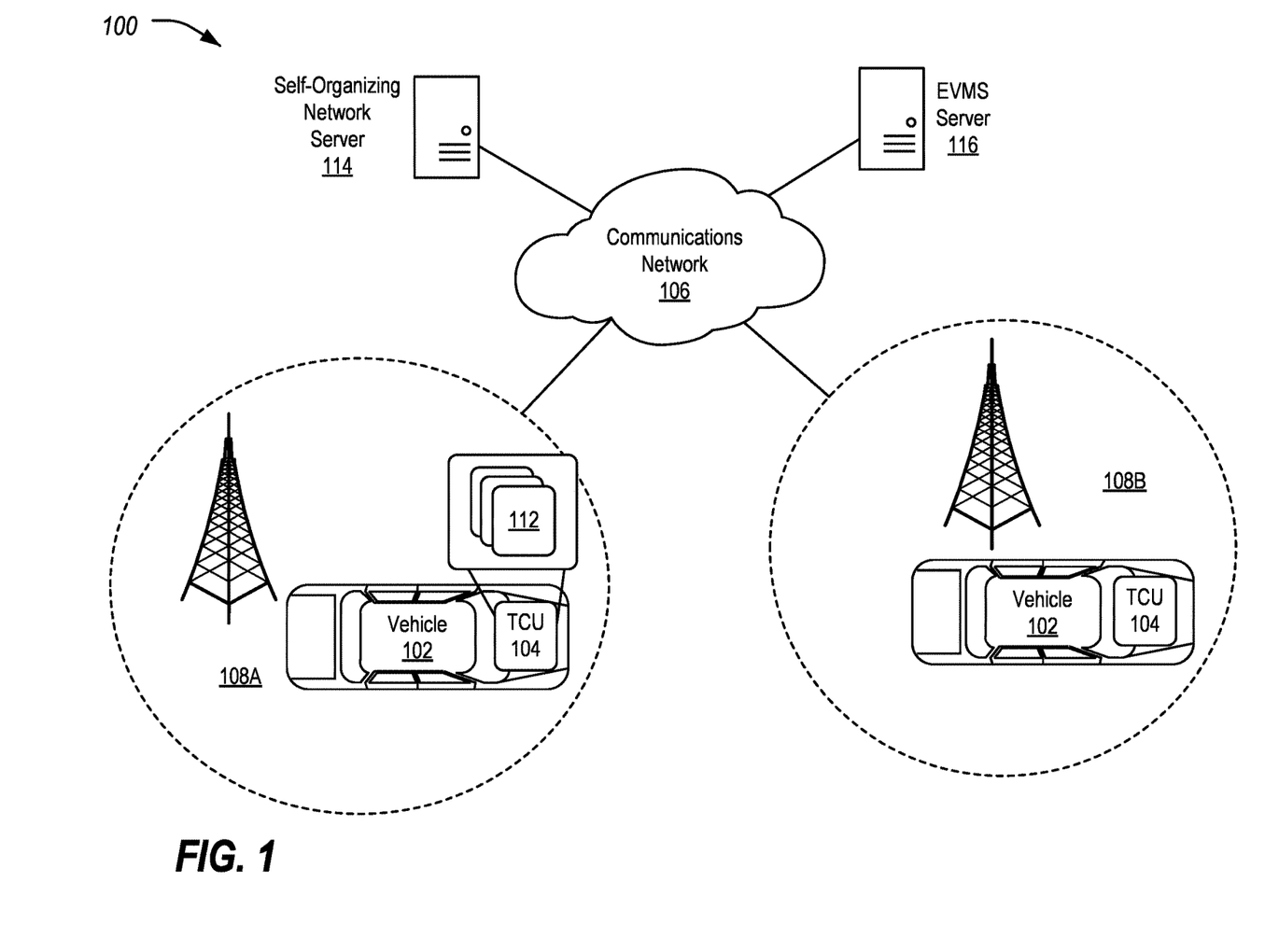
FIG. 1 illustrates an example system utilizing a SON server and an EVMS server for autonomous management of wireless connectivity of priority response vehicles.

FIG. 1 illustrates an example system 100 utilizing a SON server 114 and an EVMS server 116 for autonomous management of wireless connectivity of priority response vehicles 102. The vehicles 102 of the system 100 may include telematics control units (TCUs) 104 configured to communicate with access points 108 of the system 100. The TCUs 104 may be configured to execute various vehicle applications 112, where the vehicle applications 112 may have network requirements. As shown, the system 100 includes a communications network 106 that defines two access points 108 (108A and 108B), where each access points 108 includes a corresponding multi-access edge computing device (MEC) 110. This is simply an example, and communications networks 106 having greater quantities of access points 108 and MECs 110 are contemplated are contemplated. The SON server 114 may be configured to provide self-healing, self-configuration, and self-optimization in the communications network 106. The EVMS server 116 may be configured to optimize wireless connectivity for priority vehicles 102 or priority vehicle 102 clusters.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include a plurality of controllers configured to perform and manage various vehicle 102 functions under the power of the vehicle battery and/or drivetrain. As some non-limiting vehicle controller examples: a powertrain controller may be configured to provide control of engine operating components (e.g., idle control components, fuel delivery components, emissions control components, etc.) and for monitoring status of such engine operating components (e.g., status of engine codes); a body controller may be configured to manage various power control functions such as exterior lighting, interior lighting, keyless entry, remote start, and point of access status verification (e.g., closure status of the hood, doors and/or trunk of the vehicle 102); a radio transceiver controller may be configured to communicate with key fobs, mobile devices, or other local vehicle 102 devices; an autonomous controller may be configured to provide commands to control the powertrain, steering, or other aspects of the vehicle 102; a climate control management controller may be configured to provide control of heating and cooling system components (e.g., compressor clutch, blower fan, temperature sensors, etc.); a global navigation satellite system (GNSS) controller may be configured to provide vehicle location information; and a human-machine interface (HMI) controller may be configured to receive user input via various buttons or other controls, as well as provide vehicle status information to a driver, such as fuel level information, engine operating temperature information, and current location of the vehicle 102. The vehicle 102 may also be configured to power other devices external to the vehicle using the vehicle battery and/or drivetrain.

The vehicle bus may include various methods of communication available between the vehicle controllers, as well as between the TCU 104 and the vehicle controllers. As some non-limiting examples, a vehicle bus may include one or more of a vehicle controller area network (CAN), an Ethernet network, and a media-oriented system transfer (MOST) network. Further aspects of the layout and number of vehicle buses are discussed in further detail below. The TCU 104 may include network hardware configured to facilitate communication between the vehicle controllers and with other devices of the system 100. For example, the TCU 104 may include or otherwise access a cellular modem configured to facilitate communication with other vehicles 102 or with infrastructure. The TCU 104 may, accordingly, be configured to communicate over various protocols, such as with a communication network over a network protocol (such as Uu). The TCU 104 may, additionally, be configured to communicate over a broadcast peer-to-peer protocol (such as PC5), to facilitate cellular vehicle-to-everything (C-V2X) communications with devices such as other vehicles 102. It should be noted that these protocols are merely examples, and different peer-to-peer and/or cellular technologies may be used.

The communications network 106 may include one or more interconnected communication networks such as the Internet, a cable television distribution network, a satellite link network, a local area network, and a telephone network, as some non-limiting examples. The TCU 104 may include network hardware configured to facilitate communication between the vehicle 102 and other devices of the system 100. For example, the TCU 104 may include or otherwise access a cellular modem configured to facilitate communication with the communications network 106.

The communications network 106 may include one or more access points 108 including networking and computing resources. In an example, the access points 108 may include antennas configured to wirelessly communicate with the wireless transceivers of the devices of the system 100. In another example, the access points 108 may include one or more MECs 110 configured to provide computing resources to the access points 108. As the MECs 110 are located at the periphery of the communications network 106, the MECs 110 may be able to handle computing tasks local to the devices in communication with the communications network 106, without the transmission of data through the communications network 106.

The vehicle applications 112 may include programs to perform various functions utilizing the network and/or compute services of the communications network 106. As some examples, the vehicle applications 112 may include programs to provide directions, stream media, track weather conditions, track fleet location, monitor health of the vehicle 102, etc. As the functions of the vehicle applications 112 vary, the network and computing requirements for the vehicle applications 112 may also vary. For instance, some vehicle applications 112 may require broadband access, some vehicle applications 112 desire a low latency connection, and some vehicle applications 112 may require high computing assistance.

In some examples, the vehicle applications 112 may allow the vehicles 102 to make requests for priority service, such as to change the status of traffic controls to prefer the vehicle 102 over other vehicles 102. In other examples, the vehicle applications 112 may allow the vehicles 102 to respond to requests for priority service, such as accepting a dispatch request to attend to an incident. These priority actions may require the vehicles 102 to have robust connectivity to the communications network 106.

The SON server 114 may be a networked computing device configured to control the configuration of the system 100. In an example, the SON server 114 may be operated by the communications network 106. In another example, the SON server 114 may be operated by a fleet manager of the vehicles 102. The SON server 114 may be configured to provide various aspects of functionality to the communications network 106. These may include self-healing, self-configuration, and self-optimization. Each of these aspects is discussed in detail herein.

Self-healing refers to a mechanism whereby, if any of the existing access points 108 across the communications network 106 become inoperative, the remaining neighboring access points 108 may autonomously have their key network parameters adjusted (e.g., increase transmission power, change transmission frequency, etc.) to reduce the impact of the inoperative access point 108 and provide appropriate coverage and capacity to the end vehicles 102 (or other user equipment) previously served by the inoperative access point 108 while at the same time mitigating interference between all the neighboring access points 108.

Self-configuration refers to a plug-and-play mechanism whereby, if a new wireless access point 108 (interchangeably called access node herein) is introduced at a given geographical location across the smart city and powered on, all the existing neighboring access points 108 may autonomously have their key network parameters adjusted (e.g., reduce transmission power, change the transmission frequency, etc.) to provide appropriate coverage and capacity to the vehicles 102 (or other user equipment) in the same locality, while at the same time mitigating interference between all the neighboring access points 108 including the newly introduced access point 108.

Self-optimization is an additional a mechanism that may be implemented by the SON server 114 that complements both the self-configuration and the self-healing. Self-optimization refers to an ability of the communications network 106 to autonomously enable full exploitation of deployed access points 108 (or local network resources such as the MECs 110), to provide spectral efficiency, and thereby lead to improve network performance for the priority vehicles 102 across the communications network 106. For example, the self-optimization may adapt to changes, such as traffic variations in the locations of the vehicles 102, and carry out traffic load balancing (e.g., between the various access points 108 within a given RAT or between various access points 108 belonging to a heterogeneous communications network 106, i.e., between two or more RATs) by auto-tuning vehicle 102 handover or selection-reselection parameters. Similar to the other SON capabilities, the self-optimization may be carried out by the SON server 114, to which all key network parameter measurements are reported.

Figure 2:
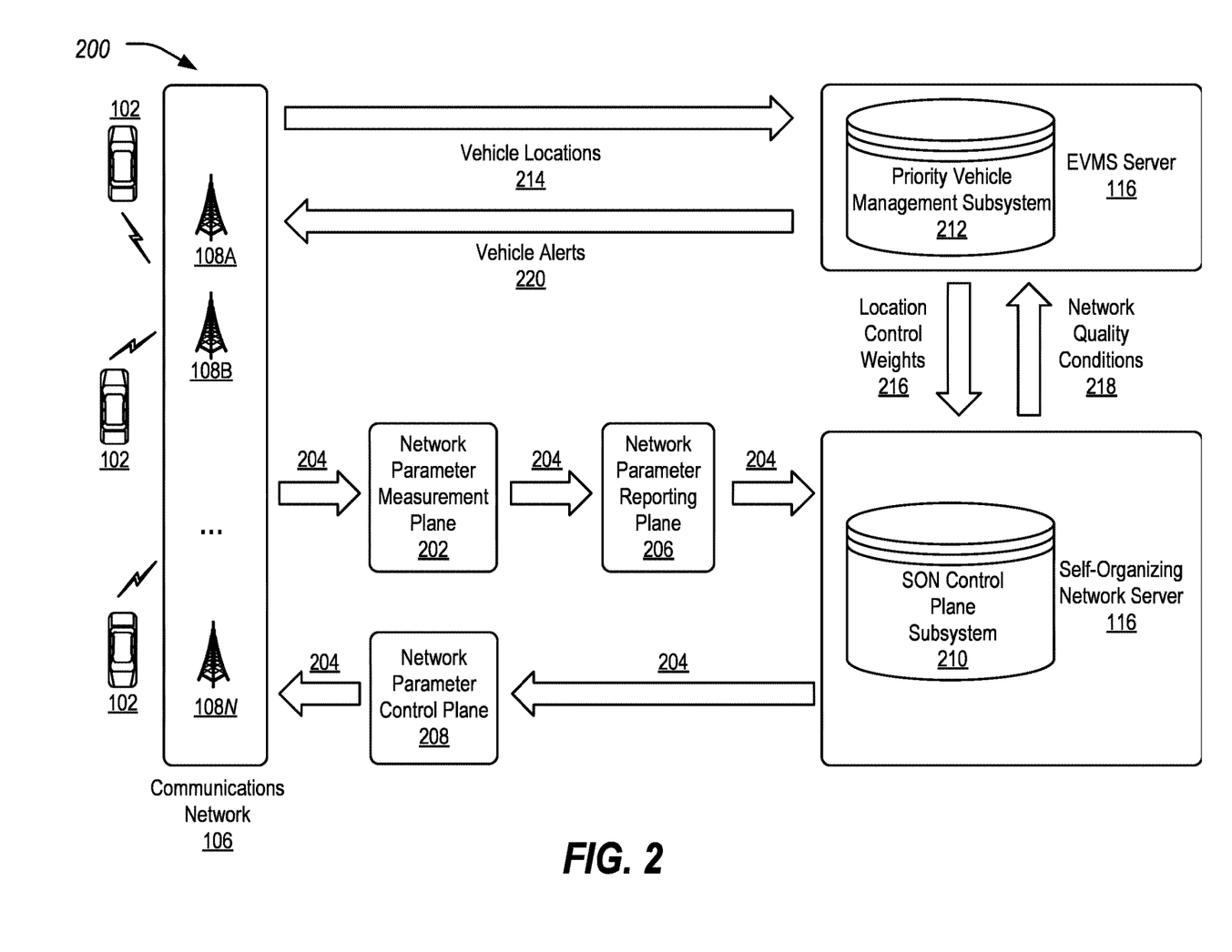
FIG. 2 illustrates an example of the data flow of the SON server and the EVMS server in the context of the communications network.

FIG. 2 illustrates an example of the data flow of the SON server 114 and the EVMS server 116 in the context of the communications network 106. As shown, a network parameter measurement plane 202 may be implemented for the access points 108 of the communications network 106. The network parameter measurement plane 202 may include one or more network sensing devices configured to capture network parameters 204 with respect to the operation of the access points 108. The network parameters 204 may include aspects representative of network quality indicators (e.g., signal power, transmission frequency, throughput rate, quantity of connected vehicles 102, etc.).

A network parameter reporting plane 206 may be configured to receive the network parameters 204, aggregate the network parameters 204 into the parameters for a period of time, and provide the network parameters 204 as aggregated to the SON server 114. The network parameter reporting plane 206 may accordingly include network transmission hardware and/or dedicated parameter reporting channels to provide the network parameters 204 to the SON server 114.

A network parameter control plane 208 may be configured to receive updated network parameters 204 from the SON server 114. These network parameters 204 may be applied by the network parameter control plane 208 to the access points 108. For instance, the SON server 114 may utilize the network parameter control plane 208 to adjust aspects such as signal power, transmission frequency, etc. of the access points 108. The network parameter control plane 208 may accordingly include network transmission hardware and/or dedicated parameter reporting channels to provide the network parameters 204 to the access points 108. It should be noted that while the network parameter reporting plane 206 and network parameter control plane 208 are shown as separate entities, in some examples, the functionality of the network parameter reporting plane 206 and the network parameter control plane 208 may be combined into a single reporting and control plane.

The SON server 114 may include a SON control plane subsystem 210. In an example, the SON control plane subsystem 210 may be implemented using the hardware and/or software resources of the SON server 114. The SON control plane subsystem 210 may be configured to receive the network parameters 204 from the access points 108 via the network parameter reporting plane 206 and provide updated network parameters 204 to the access points 108 via the network parameter control plane 208.

The SON control plane subsystem 210 may be configured to implement the self-optimization aspect of the operation of the communications network 106. Using the network parameters 204 received from the network parameter reporting plane 206, the SON control plane subsystem 210 may generate updated network parameters 204 that optimize the working of the access points 108 of the communications network 106.

As an example of the self-optimization, autonomous RF spectrum management may be performed to serve multiple priority vehicles 102 or clusters of priority vehicles 102 across a given geographical location. A probabilistic approach may be utilized to manage the RF spectrum in a self-organizing manner.

Let $S^{d,t}=(S_1^{d,t}, S_2^{d,t}, \ldots, S_n^{d,t})$ be a state vector S of length n whose elements represent network parameters network parameter 204 for each of the access points 108 (e.g., $S_1$=signal power, $S_2$=transmission frequency, $S_3$=throughput rate, etc.) measured at a given location d across the city at time t as reported to the SON server 114.

The probabilistic approach may operate under an assumption that all state vectors $S^{d,1}, S^{d,2}, \ldots, S^{d,t}, S^{d,t+1}$ satisfy the Markov Decision Process (MDP). More specifically, given all the prior state vectors $S^{d,1}, S^{d,2}, \ldots, S^{d,t}$, the next state $S^{d,t+1}$ only depends on the current state in a probabilistic sense and is independent of all the other t−1 prior states. That is, $P(S^{d,t+1}|S^{d,t}, S^{d,t-1}, \ldots, S^{d,1})=P(S^{d,t+1}|S^{d,t})$.

The resulting MDP problem may then be solved by the SON server 114 using an approach such as Q-learning. More specifically, the probabilistic approach may utilize a reinforcement learning approach, e.g., whereby the SON server 114 takes corrective actions based on rewards gained or lost from previously taking analogous actions while moving from a certain state to the next. The solving mechanism of the MDP problem in reinforcement learning may be considered as a machine learning approach whereby, for example, whenever/wherever a corrective action (e.g., increase or reduce transmission power, change transmission frequency, etc.) is taken by the SON server 114, and that action results in an increase of a given key performance indicator (KPI), e.g., higher signal strength, higher data throughput, or a reduced signal error rate, then a reward or an increase of change in that direction is made until the KPI is observed to become stable or decrease. If the KPI drops, then a corrective action in the opposite direction (e.g. reduce signal transmission power, etc.) may be made or attempted.

The SON control plane subsystem 210 may accordingly utilize the results of the probabilistic approach to determine updated network parameters 204 to be applied to the access points 108 of the communications network 106. These updated network parameters 204 may implement the actions that are indicated by the solving of the probability approach algorithm. These network parameters 204 may be provided to the network parameter control plane 208 for implementation by the access points 108 of the communications network 106. The process of updating the network parameters 204 may be performed periodically in many implementations.

The EVMS server 116 may be in communication with the SON server 114. In some examples, the EVMS server 116 may be operated by the priority vehicle 102 fleet provider, as opposed to being under the control of the network service provider. The fleet provider may be an original equipment manufacturer (OEM) or another authorized institution with access to the operability of the priority vehicle 102 fleet. The EVMS server 116 may include a priority vehicle management subsystem 212. In an example, the priority vehicle management subsystem 212 may be implemented using the hardware and/or software resources of the EVMS server 116.

The EVMS server 116 may be configured to receive vehicle locations 214 from the vehicles 102. In an example, the EVMS server 116 may receive the locations of priority vehicles 102 that are in the area served by the communications network 106. This may be accomplished through various approaches. For instance, the vehicles 102 may determine their locations, e.g., via GNSS or other location technologies, and may self-report their locations to the EVMS server 116 via messaging to the EVMS server 116 over the communications network 106. These messages may, for example, include identifiers of the vehicles 102, such as VIN, account identifiers, globally unique identifier (GUID) assigned to the vehicles 102, assigned fleet numbers, account identifiers of drivers or other occupants of the vehicles 102, etc.

In another example, the network layers of the communications network 106 may provide information about which of the access points 108 the modems of the vehicles 102 are connected to the communications network 106. In such an example, the information about vehicle 102 connections to the access point 108 may be provided by the communications network 106 to the EVMS server 116 passively, without the vehicles 102 sending location messages to the EVMS server 116 directly.

The vehicle locations 214 may be used for various operations. For example, the EVMS server 116 may utilize the vehicle locations 214 and information about the vehicles 102 to generate location control weights 216. The location control weights 216 may be indicative of the relative priority in providing communications services to different areas of the communications network 106. In one example, each access point 108 is assigned a location control weight 216 corresponding to the vehicles 102 located within the service area (or simply proximity) to the respective access point 108.

If an area includes one or more priority vehicles 102, then that area may be given more priority in receiving communications services that an area without priority vehicles 102. In a simple example, the weight may be a sum of the total quantity of priority vehicles 102 located within the area represented by the location control weight 216.

In a more sophisticated example, priority vehicles 102, or clusters of priority vehicles 102, may be scored based on factors such as type of vehicle 102 (ambulances, tow trucks, etc.), whether the vehicle 102 is a member of a priority fleet, etc. In such an example, the weight may be a sum of the total scored of priority vehicles 102 located within the area represented by the location control weight 216.

In one specific example, incidents or requests for priority response vehicles 102 may be assigned a weight (e.g., by dispatch), and these weights may be used as the location control weights 216. For instance, a priority vehicle 102 or cluster of priority response vehicles 102 in a first location served by a first access point 108 may be responding to a building issue or a criminal incident, whereas vehicles 102 in a second location served by a second access point 108 may be responding to a petty shoplifting incident or another less urgent disturbance. Thus, the location control weight 216 for the first access point 108 may be set to a higher priority than the location control weight 216 for the location second access point 108.

The SON server 114 may utilize these location control weights 216 received from the EVMS server 116 in the probabilistic approach for determining network parameters 204. The location control weights 216 may be represented as $\alpha_1, \alpha_2, \ldots, \alpha_l$, where each location may be given a separate location control weight 216. The location control weight 216 at position d may be considered as taking on a value of one of the states (e.g., an element of the state vector) in the MDP process. Alternatively, location control weight 216 may be considered as an external parameter taken into account and/or automatically assigned or generated by the EVMS to a given location d during the vehicle fleet prioritization, while also optimally taking advantage of the SON optimized network (e.g., in order to best serve and/or direct the vehicles 102 to or through the location/route with the best network quality conditions).

As noted above, at each instant t, the SON server 114 may send updated network parameters 204 to the network parameter control plane 208. Additionally, at each instant t, the SON server 114 may report network quality information 218 to the EVMS server 116. This network quality information 218 may include information with respect to the available service within the communications network 106 as indicate by an aggregation of the network parameters 204 performed by the SON server 114 using the data obtained from various access points 108. For instance, the network quality information 218 may indicate a relative quality score for various geographical locations (e.g., the access points 108, a grid of data points, quality along the roadways, etc.).

The EVMS server 116 may utilize the network quality information 218 for various purposes. In an example, the EVMS server 116 may utilize the network quality information 218 as a factor in routing priority vehicles 102. For instance, the EVMS server 116 may send a dispatch request to one or more priority vehicles 102, requesting those vehicles 102 to move along a route to a destination location, where the route is formed along the roadways to circumvent locations where network quality is low. In one example, a network quality score may be assigned to each segment of road (either from the network quality information 218 directly, or by the EVMS server 116 based on the locations indicated in the network quality information 218). These assigned values may be applied as weights to the road segments, and a routing algorithm (e.g., Dijkstra's algorithm, the A* algorithm, etc.) may be used to find a lowest total path accounting for the weights from the current location of the vehicle 102 to the destination of the dispatch request. This may allow for the priority vehicles 102 to circumvent areas of poor network quality.

The EVMS server 116 may also be configured to send alerts 220 to the priority vehicles 102 as they traverse the routes, based on updated network quality information 218 received from the SON server 114. In an example, the alerts 220 may indicate to the vehicles 102 of potential coverage outages along the route being traversed by the vehicle 102. In another example, the alerts 220 may recommend different routes to the vehicles 102 that circumvent connectivity issues with the access points 108. By receiving the alerts 220 and adjusting routing based on the alerts 220, the system 100 optimize operation of the communications network 106 for the priority vehicles 102.

Figure 3:
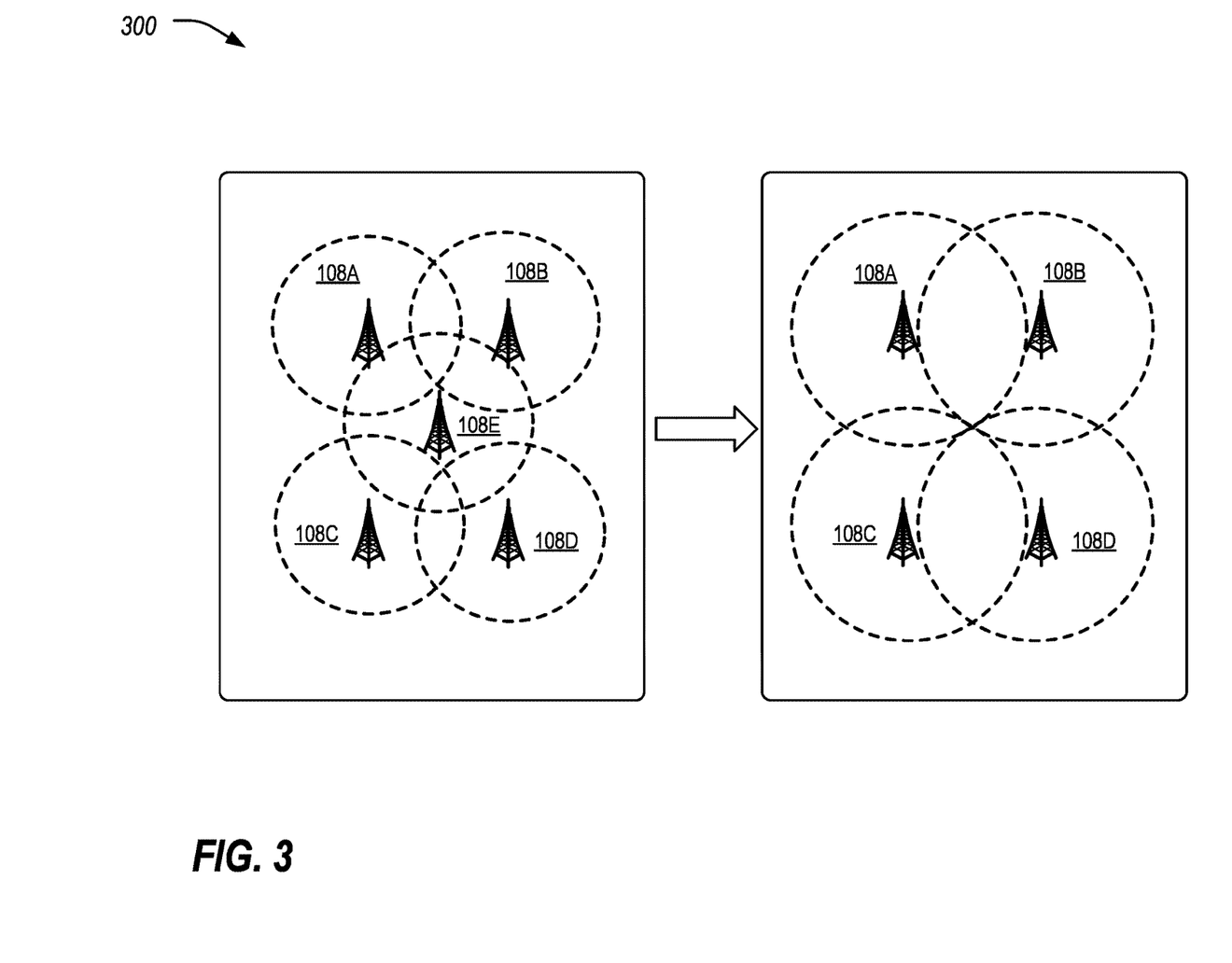
FIG. 3 illustrates an example of the system performing self-healing after one of the existing access points becomes inoperative.

FIG. 3 illustrates an example 300 of the system 100 performing self-healing after one of the existing access points 108 becomes inoperative. As shown, the communications network 106 may initially include five access points 108 (access points 108A, 108B, 108C, 108D, and 108E). The access point 108E may go out of service. As a result, the SON server 114 may adjust the other access points 108A-D to increase transmission power and/or change transmission frequencies continue to provide service for the area formerly covered by the access point 108E. For instance, the SON server 114 may receive network parameters 204 indicating that the lack of operation of access point 108E and the continued operation of access points 108A, 108B, 108C, 108D. Using the SON control plane subsystem 210, the SON server 114 may determine updated network parameters 204. These network parameters 204 may adjust the communications network 106 to increase the service area of each of the remaining access points 108A-D to cover the area formerly covered by the access point 108E. This may accordingly illustrate an example of the communications network 106 performing self-healing.

Figure 4:
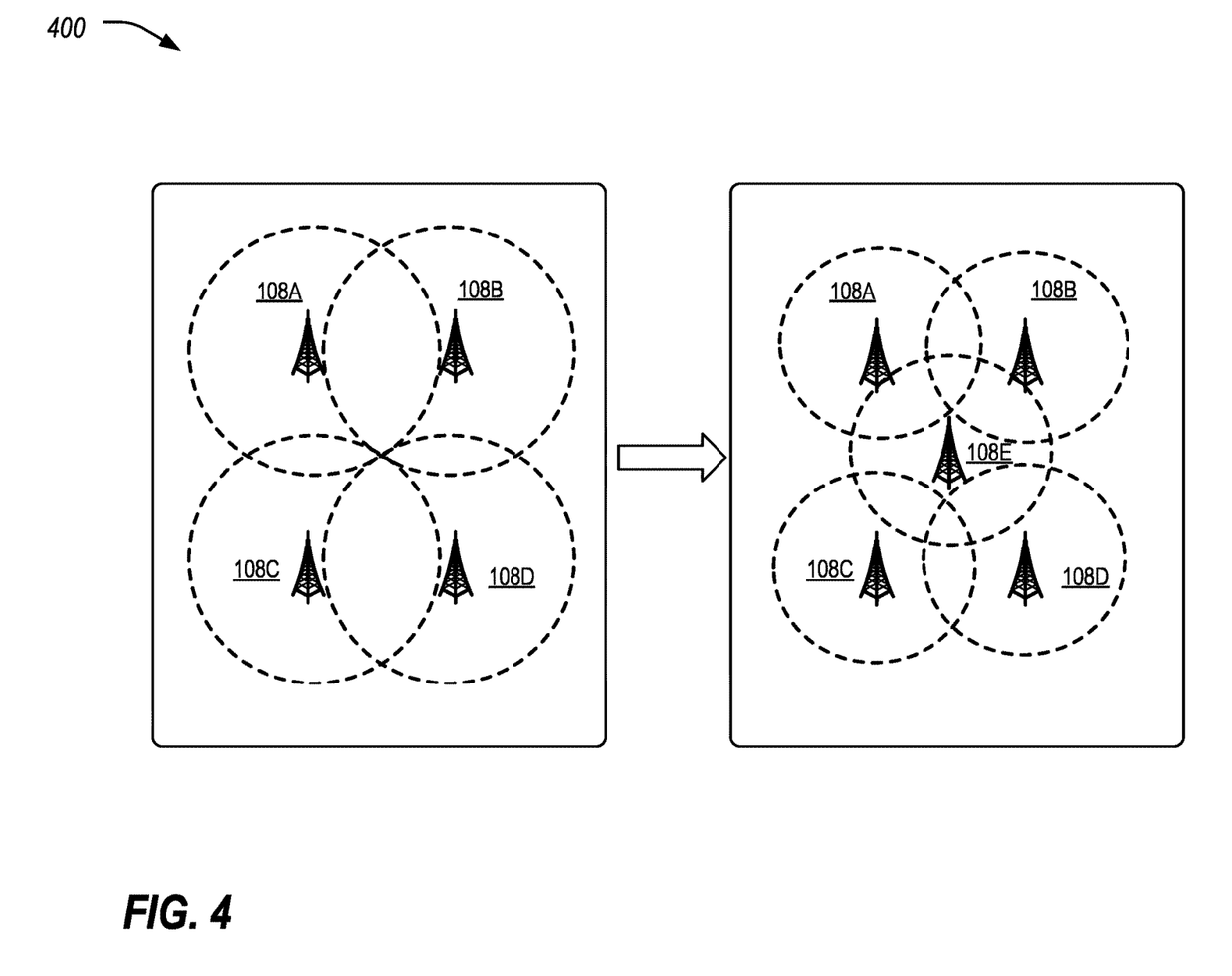
FIG. 4 illustrates an example of the system performing self-configuration after the addition of a new access point to the communications network.

FIG. 4 illustrates an example 400 of the system 100 performing self-configuration after the addition of a new access point 108 to the communications network 106. As shown, the communications network 106 may initially include four access points 108 (access points 108A, 108B, 108C, and 108D). The access point 108E may be installed and come into service between the existing four access points 108A-D. For instance, the SON server 114 may receive network parameters 204 indicating the new operation of access point 108E and the continued operation of access points 108A, 108B, 108C, 108D. As a result, the SON server 114 may adjust the other access points 108A-D to allow the access point 108E to take primary control of the central area. Using the SON control plane subsystem 210, the SON server 114 may determine updated network parameters 204. These network parameters 204 may adjust the communications network 106 to decrease the service area of each of the remaining access points 108A-D in an attempt to uncover the area now covered by the access point 108E. This may accordingly illustrate an example of the communications network 106 performing self-configuring.

Figure 5:
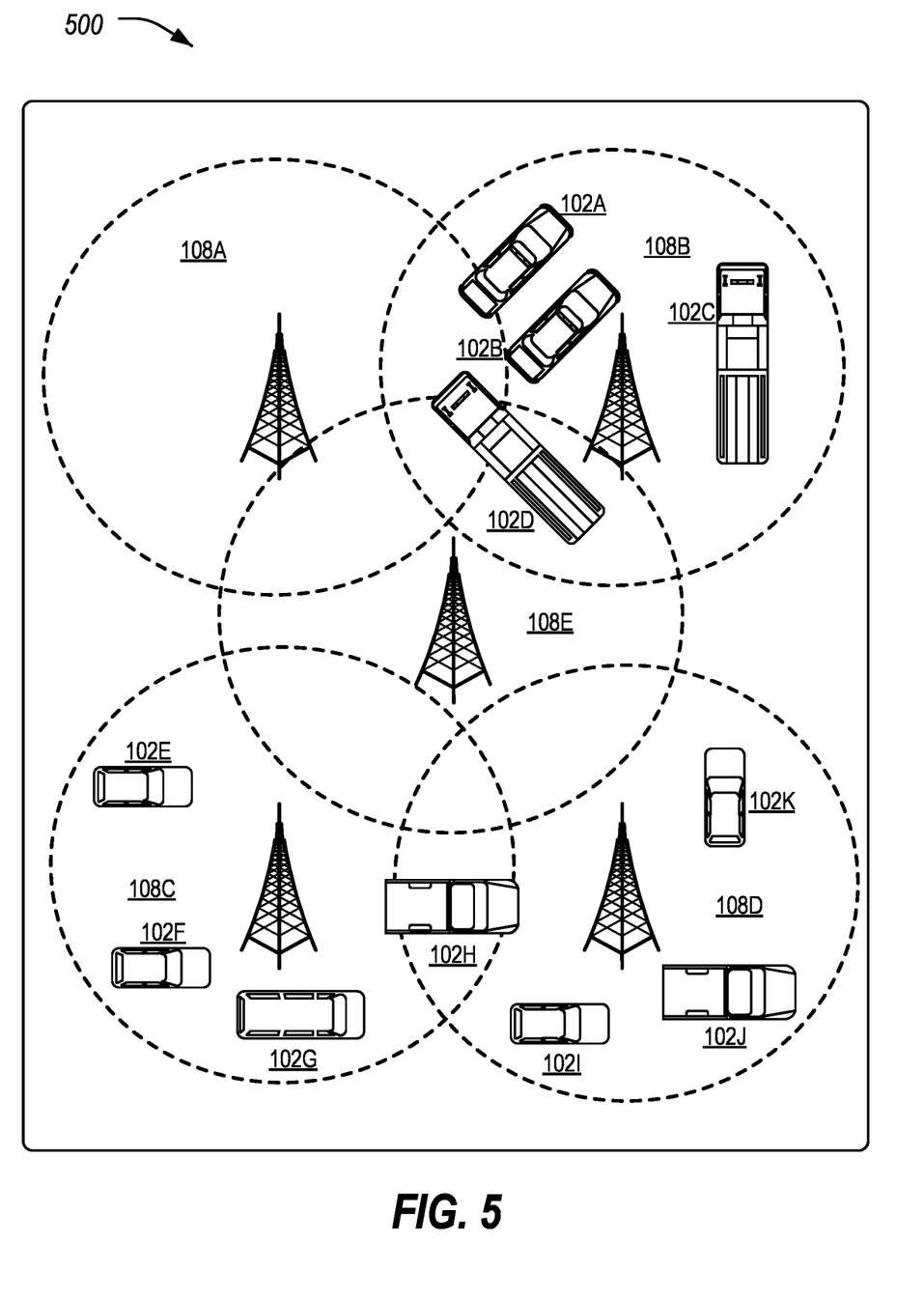
FIG. 5 illustrates an example of the system performing self-optimization based on the location of a cluster of priority vehicles.

FIG. 5 illustrates an example 500 of the system 100 performing self-optimization based on the location of a cluster of priority vehicles 102. As shown, the communications network 106 may initially include five access points 108 (access points 108A, 108B, 108C, 108D, and 108E). Additionally, the example 500 includes vehicles 102 utilizing the connectivity of the communications network 106. A cluster of priority vehicles 102 (vehicles 102A, 102B, 102C, and 102D) is located in the service area for access point 108B. A cluster of non-priority vehicles 102 (vehicles 102E, 102F, 102G, 102H, 102I, 102J, and 102J) is located in the service area for access points 108C and 108D. Because of the cluster of priority vehicles 102, the network parameters 204 of the access point 108B may be adjusted to prefer access to vehicles within the service area of the access point 108B. This may allow for the priority vehicles 102 have better access to the communications network 106. For instance, additional frequencies may be allocated from the other access points 108 to the access point 108B. Or transmission power of the access point 108B may be increased and transmission power of the other access points 108 may be decreased. It should be noted that these actions may reduce the network quality of other locations of the communications network 10; however, the connectivity of the area in which the priority vehicles 102 are operating may be considered to take precedence.

Figure 6:
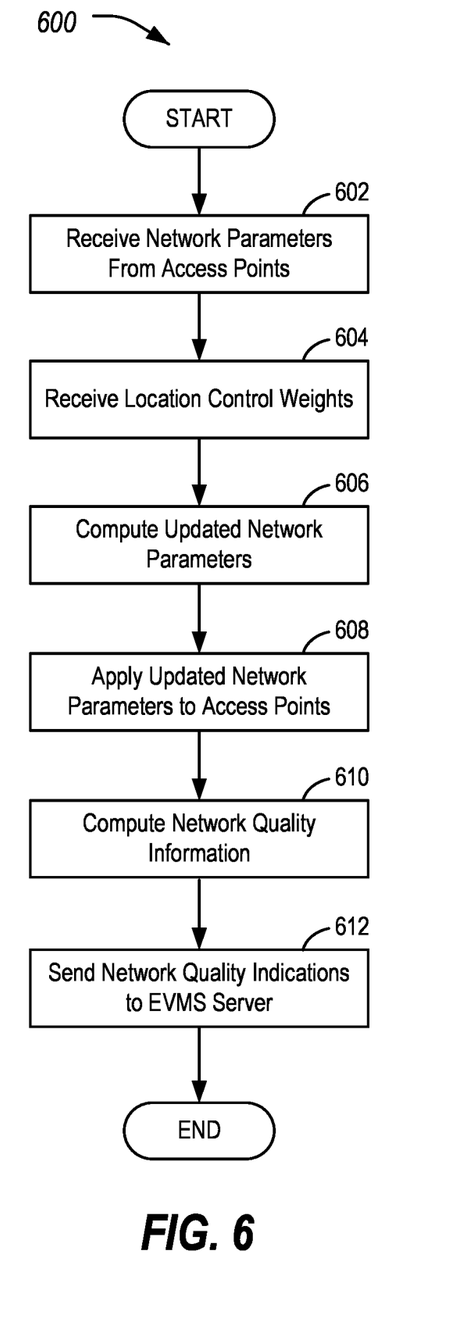
FIG. 6 illustrates an example process for the SON server for autonomous management of wireless connectivity of priority response vehicles.

FIG. 6 illustrates an example process 600 for utilizing the SON server 114 for autonomous management of wireless connectivity of priority response vehicles 102. In an example, the process 600 may be performed by the SON server 114 in the context of the system 100. For instance the process 600 may be performed periodically every time t, as noted above. It should be noted that while the process 600 is represented as a series of operations, one or more of the operations of the process 600 may be performed concurrently or in a different ordering than as shown.

At operation 602, the SON server 114 receives network parameters 204 from the access points 108. In an example, a network parameter reporting plane 206 may be configured to receive the network parameters 204, aggregate the network parameters 204 into the parameters for a period of time, and provide the network parameters 204 as aggregated to the SON server 114. This information may be received to the SON server 114.

Figure 7:
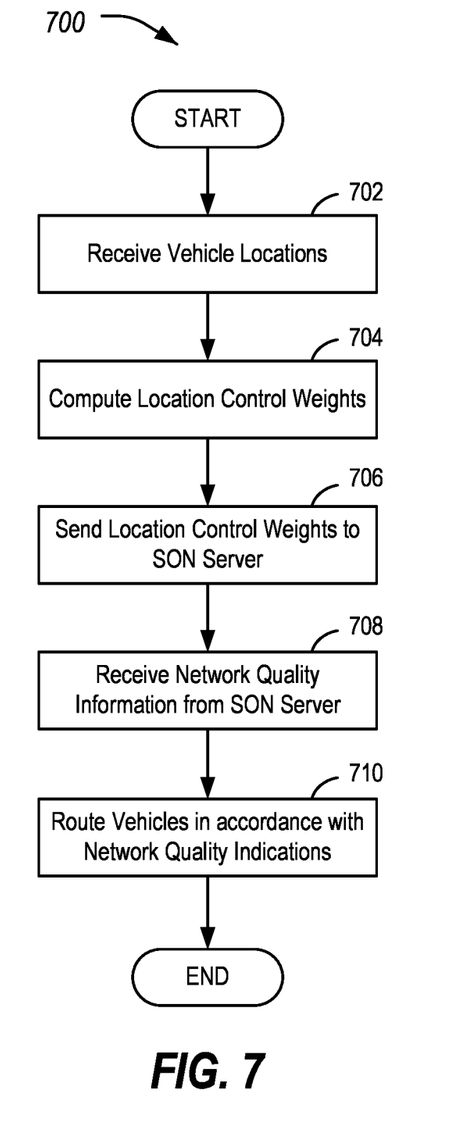
FIG. 7 illustrates an example process for the EVMS server for autonomous management of wireless connectivity of priority response vehicles.

At operation 604, the SON server 114 receives location control weights 216. In an example, as noted below with respect to operation 706 of the process 700, the EVMS server 116 may be configured to receive vehicle locations 214 from the vehicles 102 and determine the location control weights 216. The SON server 114 may receive the location control weights 216 from the EVMS server 116.

At operation 606, the SON server 114 computers updated network parameters 204. In an example, the SON server 114 may utilize the network parameters 204 and the location control weights 216 in the probabilistic approach for determining a new state for the network parameters 204. For instance the approach may utilize a state vector S of the network parameters 204 as noted above, weighted by the location control weights 216 as noted above. The state may be resolved using an approach such as a reinforcement learning approach, At operation 608, the SON server 114 applies the updated network parameters 204 to the access points 108. In an example, the SON server 114 may provide the network parameters 204 computed at operation 606 to the network parameter control plane 208 for implementation by the access points 108 of the communications network 106.

At operation 610, the SON server 114 computes network quality information 218. In an example, this network quality information 218 may include information with respect to the available service within the communications network 106 as indicate by an aggregation of the network parameters 204 performed by the SON server 114 using the data obtained from various access points 108. For instance, the network quality information 218 may indicate a relative quality score for various geographical locations (e.g., the access points 108, a grid of data points, quality along the roadways, etc.).

At operation 612, the SON server 114 sends the network quality information 218 to the EVMS server 116. For example, the SON server 114 may report network quality information 218 computed at operation 610 to the EVMS server 116. After operation 612 the process 600 ends.

FIG. 7 illustrates an example process 600 for utilizing the EVMS server 116 for autonomous management of wireless connectivity of priority response vehicles 102. In an example the process 700 may be performed by the EVMS server 116 in the context of the system 100. It should be noted that while the process 700 is represented as a series of operations, one or more of the operations of the process 700 may be performed concurrently or in a different ordering than as shown.

At operation 702, the EVMS server 116 receives locations of the vehicles 102. In an example, the EVMS server 116 may receive the locations of priority vehicles 102 that are in the area served by the communications network 106. This may be accomplished through various approaches. For instance, the vehicles 102 may determine their locations, e.g., via GNSS or other location technologies, and may self-report their locations to the EVMS server 116 via messaging to the EVMS server 116 over the communications network 106. In another example, the network layers of the communications network 106 may provide information about which of the access points 108 the modems of the vehicles 102 are connected to the communications network 106.

At operation 704, the EVMS server 116 computes location control weights 216. The location control weights 216 may be indicative of the relative priority in providing communications services to different areas of the communications network 106. In one example, each access point 108 is assigned a location control weight 216 representative of the vehicles 102 located within the service area (or simply proximity) to the respective access point 108. For instance, if an area includes one or more priority vehicles 102, then that area may be given more priority in receiving communications services that an area without priority vehicles 102.

At operation 706, the EVMS server 116 sends the location control weights 216 to the SON server 114. This information is received by the SON server 114 as noted at operation 604 of the process 600.

At operation 708, the EVMS server 116 receives network quality information 218 from the SON server 114. This information is sent by the SON server 114 as noted at operation 612 of the process 600.

At operation 710, the EVMS server 116 routes vehicles 102 in accordance with the network quality information 218. For instance, the EVMS server 116 may send a dispatch request to one or more priority vehicles 102, requesting those vehicles 102 to move along a route to a destination location, where the route is formed along the roadways to circumvent locations where network quality is low. In one example, a network quality score may be assigned to each segment of road (either from the network quality information 218 directly, or by the EVMS server 116 based on the locations indicated in the network quality information 218). These assigned values may be applied as weights to the road segments, and a routing algorithm (e.g., Dijkstra's algorithm, the A* algorithm, etc.) may be used to find a lowest total path accounting for the weights from the current location of the vehicle 102 to the destination of the dispatch request. This may allow for the priority vehicles 102 to circumvent areas of poor network quality.

In another example, the EVMS server 116 may also be configured to send alerts 220 to the priority vehicles 102 as they traverse the routes, based on updated network quality information 218 received from the SON server 114. In an example, the alerts 220 may indicate to the vehicles 102 of potential coverage outages along the route being traversed by the vehicle 102. In another example, the alerts 220 may recommend different routes to the vehicles 102 that circumvent connectivity issues with the access points 108. By receiving the alerts 220 and adjusting routing based on the alerts 220, the system 100 optimize operation of the communications network 106 for the priority vehicles 102. After operation 710, the process 700 ends.

Thus, the disclosed approach allows for management and optimization of wireless network resources of the communications network 106 in a self-organizing manner. For instance, the radio access technologies may be optimized for serving priority response vehicles 102. The proposed solution comes with several benefits to enable uninterrupted wireless network access across the communications network 106. These benefits to ensure successful and timely priority response.

For instance, in a self-configuration aspect, newly installed wireless access points 108 may be considered in updating the configuration of the access points 108 of the communications network 106. Additionally, in a self-healing aspects, the ability to manage unwanted (and perhaps sudden) downtimes of access points 108 by autonomously readjusting the network parameters 204 of the remaining access points 108 may be performed to ensure continuity of coverage.

Also, in a self-optimization aspect, RF spectrum management may be used to ensure the optimal use of bandwidth resources in handling situations such as intra-RAT or inter-RAT interference, network traffic/congestion, service handovers (from once access point 108 to another). This may ensure continued delivery of desired data throughput (beyond a predetermined minimum service threshold) for the priority vehicles 102.

In addition to the SON server 114 allowing for autonomous radio access control, the EVMS server 116 for managing the priority response vehicles 102 may take into account the network quality indicators provided from SON server 114 and manage the priority vehicles 102 with useful alerts 220 and/or recommend routes or other courses of actions based on the priority of the dispatch being performed by the priority vehicle 102.

Figure 8:
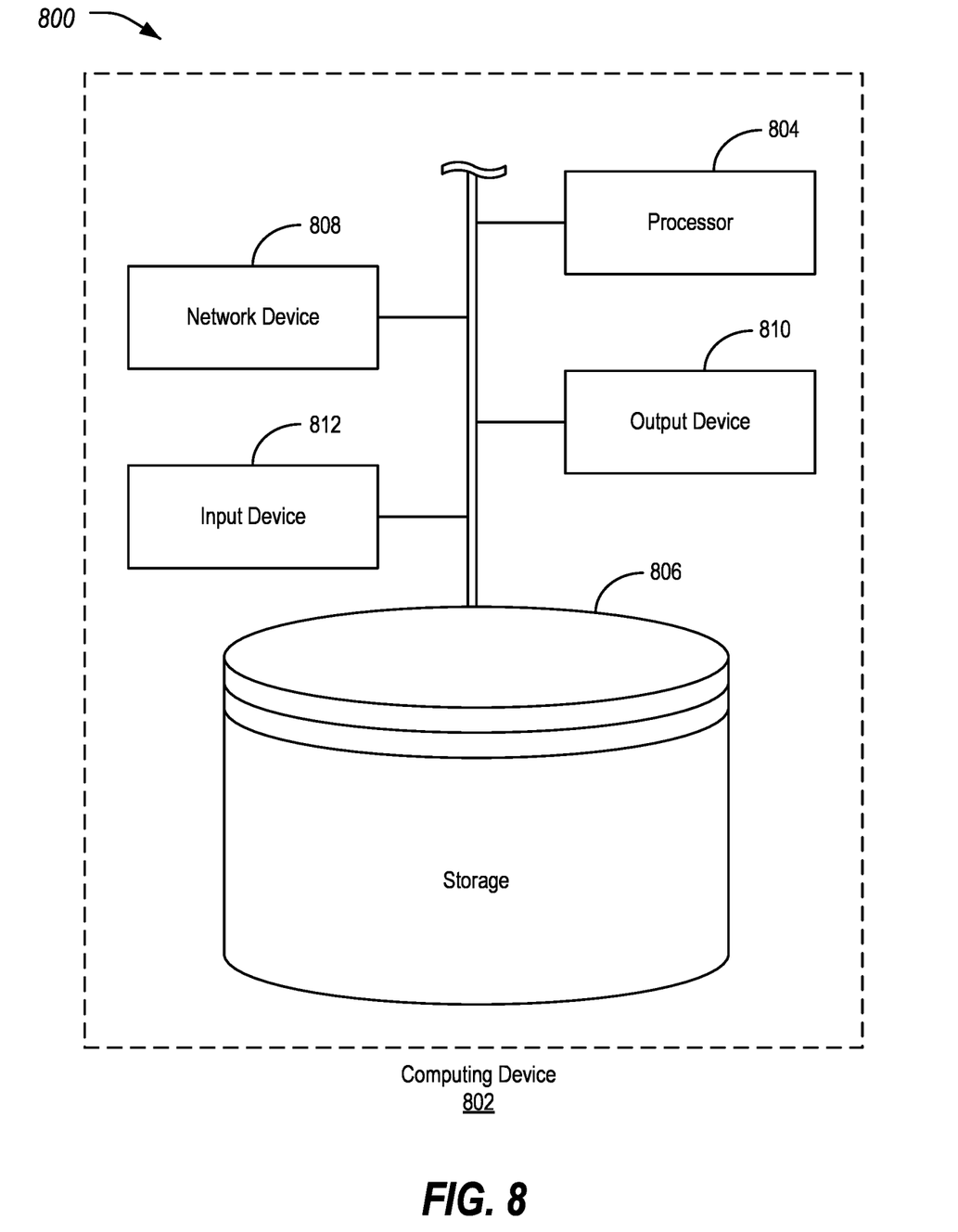
FIG. 8 illustrates an example computing device for use in the autonomous management of wireless connectivity of priority response vehicles.

FIG. 8 illustrates an example computing device 802 for use in the autonomous management of wireless connectivity of priority response vehicles 102. Referring to FIG. 8, and with reference to FIGS. 1-8, the vehicles 102, TCUs 104, communications network 106, access points 108, MECs 110, SON servers 114, and EVMS servers 116 generally include computer-executable instructions, where the instructions may be executable by one or more computing devices 802. Computer-executable instructions may be compiled or interpreted from computer programs created using a variety of programming languages and/or technologies, including, without limitation, and either alone or in combination, Java™, C, C++, C#, Visual Basic, JavaScript, Python, JavaScript, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data, such as the network parameters 204, the vehicle locations 214, the location control weights 216, and the network quality information 218 may be stored and transmitted using a variety of computer-readable media.

As shown, the computing device 802 may include a processor 804 that is operatively connected to a storage 806, a network device 808, an output device 810, and an input device 812. It should be noted that this is merely an example, and computing devices 802 with more, fewer, or different components may be used.

The processor 804 may include one or more integrated circuits that implement the functionality of a central processing unit (CPU) and/or graphics processing unit (GPU). In some examples, the processors 804 are a system on a chip (SoC) that integrates the functionality of the CPU and GPU. The SoC may optionally include other components such as, for example, the storage 806 and the network device 808 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or Microprocessor without Interlocked Pipeline Stages (MIPS) instruction set families.

Regardless of the specifics, during operation the processor 804 executes stored program instructions that are retrieved from the storage 806. The stored program instructions, accordingly, include software that controls the operation of the processors 804 to perform the operations described herein. The storage 806 may include both non-volatile memory and volatile memory devices. The non-volatile memory includes solid-state memories, such as Not AND (NAND) flash memory, magnetic and optical storage media, or any other suitable data storage device that retains data when the system is deactivated or loses electrical power. The volatile memory includes static and dynamic random access memory (RAM) that stores program instructions and data during operation of the system 100.

The GPU may include hardware and software for display of at least two-dimensional (2D) and optionally three-dimensional (3D) graphics to the output device 810. The output device 810 may include a graphical or visual display device, such as an electronic display screen, projector, printer, or any other suitable device that reproduces a graphical display. As another example, the output device 810 may include an audio device, such as a loudspeaker or headphone. As yet a further example, the output device 810 may include a tactile device, such as a mechanically raisable device that may, in an example, be configured to display braille or another physical output that may be touched to provide information to a user.

The input device 812 may include any of various devices that enable the computing device 802 to receive control input from users. Examples of suitable input devices 812 that receive human interface inputs may include keyboards, mice, trackballs, touchscreens, microphones, graphics tablets, and the like.

The network devices 808 may each include any of various devices that enable the described components to send and/or receive data from external devices over networks. Examples of suitable network devices 808 include an Ethernet interface, a Wi-Fi transceiver, a cellular transceiver, or a BLUETOOTH or Bluetooth Low Energy (BLE) transceiver, or other network adapter or peripheral interconnection device that receives data from another computer or external data storage device, which can be useful for receiving large sets of data in an efficient manner.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A system for autonomous management of wireless connectivity of priority response vehicles, comprising:
   a plurality of access points to a communications network, the access points configured to provide communications services to priority vehicles and non-priority vehicles;
   a self-organizing network (SON) server, in communication with the plurality of access points, programmed to provide self-healing, self-configuration, and self-optimization services to the communications network; and
   an enhanced vehicle management system (EVMS) server, in communication with the SON server, configured to
      receive locations of the priority vehicles over the communications network,
      utilize the SON server to optimize wireless connectivity for the priority vehicles,
      receive network quality information from the SON server, and
      route the priority vehicles based on the network quality information by performing operations including to:
         send a dispatch request to a priority vehicle, requesting the priority vehicle to move from a current location of the priority vehicle to a destination location;
         assign a network quality score as weights to each segment of roadway according to the network quality information;
         find a lowest cost route accounting for the weights from the current location of the vehicle to the destination location, thereby allowing for the priority vehicle to circumvent areas of poor network quality; and
         send the route to the priority vehicle.

2. The system of claim 1, wherein the EVMS server is further configured to:
   receive updated network quality information from the SON server; and
   send an alert to the priority vehicle to indicate to the priority vehicle of potential coverage outages along the route being traversed by the priority vehicle.

3. A system for autonomous management of wireless connectivity of priority response vehicles, comprising:
   a plurality of access points to a communications network, the access points configured to provide communications services to priority vehicles and non-priority vehicles;
   a self-organizing network (SON) server, in communication with the plurality of access points, programmed to provide self-healing, self-configuration, and self-optimization services to the communications network; and
   an enhanced vehicle management system (EVMS) server, in communication with the SON server, configured to
      receive locations of the priority vehicles over the communications network,
      utilize the SON server to optimize wireless connectivity for the priority vehicles,
      receive network quality information from the SON server,
      route the priority vehicles based on the network quality information,
      generate location control weights based on the locations of the priority vehicles, the location control weights being indicative of relative priority in providing the communications services to different areas of the communications network, and
      send the location control weights to the SON server, to cause the SON server to optimize the wireless connectivity for the priority vehicles.

4. The system of claim 3, wherein the SON server is further configured to:
   create a state vector whose elements represent initial network parameters received from the plurality of access points;
   weight the state vector in accordance with the location control weights;
   generate updated network parameters based on the state vector as weighted; and
   apply the updated network parameters to the access points.

5. The system of claim 4, where the initial network parameters indicate that one of the plurality of access points has becomes an inoperative access point, and the updated network parameters include to increase service area of at least a portion of the plurality of access points that are still operative to cover the area formerly covered by the inoperative access point.

6. The system of claim 4, where the initial network parameters indicate an addition of a new access point to the plurality of access points, and the updated network parameters include to decrease service area of at least a portion of the plurality of access points to allow the new access point to take control of a portion of area located around the new access point.

7. A method for autonomous management of wireless connectivity of priority response vehicles, comprising:
receiving, from a communications network including a plurality of access points, the access points configured to provide communications services to priority vehicles and non-priority vehicles, locations of the priority vehicles over the communications network;
utilizing a SON server, in communication with the plurality of access points, to optimize wireless connectivity for the priority vehicles;
receiving, by an enhanced vehicle management system (EVMS) server, in communication with the SON server, network quality information from the SON server; and
routing the priority vehicles based on the network quality information including:
sending a dispatch request to a priority vehicle, requesting the priority vehicle to move from a current location of the priority vehicle to a destination location;
assigning a network quality score as weights to each segment of roadway according to the network quality information;
finding a lowest cost route accounting for the weights from the current location of the vehicle to the destination location, thereby allowing for the priority vehicle to circumvent areas of poor network quality; and
sending the route to the priority vehicle.

8. The method of claim 7, further comprising, by the EVMS server:
receiving updated network quality information from the SON server; and
sending an alert to the priority vehicle to indicate to the priority vehicle of potential coverage outages along the route being traversed by the priority vehicle.

9. A method for autonomous management of wireless connectivity of priority response vehicles, comprising:
receiving, from a communications network including a plurality of access points, the access points configured to provide communications services to priority vehicles and non-priority vehicles, locations of the priority vehicles over the communications network;
utilizing a SON server, in communication with the plurality of access points, to optimize wireless connectivity for the priority vehicles;
receiving, by an enhanced vehicle management system (EVMS) server, in communication with the SON server, network quality information from the SON server;
routing the priority vehicles based on the network quality information;
generating location control weights based on the locations of the priority vehicles, the location control weights being indicative of relative priority in providing the communications services to different areas of the communications network; and
sending the location control weights to the SON server, to cause the SON server optimize the wireless connectivity for the priority vehicles.

10. The method of claim 9, further comprising, by the SON server:
creating a state vector whose elements represent initial network parameters received from the plurality of access points;
weighting the state vector in accordance with the location control weights;
generating updated network parameters based on the state vector as weighted; and
applying the updated network parameters to the access points.

11. The method of claim 10, where the initial network parameters indicate that one of the plurality of access points has becomes an inoperative access point, and the updated network parameters include to increase service area of at least a portion of the plurality of access points that are still operative to cover the area formerly covered by the inoperative access point.

12. The method of claim 10, where the initial network parameters indicate an addition of a new access point to the plurality of access points, and the updated network parameters include to decrease service area of at least a portion of the plurality of access points to allow the new access point to take control of a portion of area located around the new access point.

13. A non-transitory computer-readable medium comprising instruction for autonomous management of wireless connectivity of priority response vehicles, that when executed by one or more computing devices, cause the one or more computing devices to perform operations including to:
receive, from a communications network including a plurality of access points, the access points configured to provide communications services to priority vehicles and non-priority vehicles, locations of the priority vehicles over the communications network;
utilize a SON server, in communication with the plurality of access points, to optimize wireless connectivity for the priority vehicles;
receive, by an enhanced vehicle management system (EVMS) server, in communication with the SON server, network quality information from the SON server; and
route the priority vehicles based on the network quality information, including to
send a dispatch request to a priority vehicle, requesting the priority vehicle to move from a current location of the priority vehicle to a destination location,
assign a network quality score as weights to each segment of roadway according to the network quality information,
find a lowest cost route accounting for the weights from the current location of the vehicle to the destination location, thereby allowing for the priority vehicle to circumvent areas of poor network quality, and
send the route to the priority vehicle.

14. The medium of claim 13, further comprising instructions that, when executed by the one or more computing devices, cause the one or more computing devices to perform operations including to:
receiving updated network quality information from the SON server; and
sending an alert to the priority vehicle to indicate to the priority vehicle of potential coverage outages along the route being traversed by the priority vehicle.

15. The medium of claim 13, further comprising instructions that, when executed by the one or more computing devices, cause the one or more computing devices to perform operations including to:

generating location control weights based on the locations of the priority vehicles, the location control weights being indicative of relative priority in providing the communications services to different areas of the communications network; and sending the location control weights to the SON server, to cause the SON server optimize the wireless connectivity for the priority vehicles.

16. The medium of claim 15, further comprising instructions that, when executed by the one or more computing devices, cause the one or more computing devices to perform operations including to:

creating a state vector whose elements represent initial network parameters received from the plurality of access points;

weighting the state vector in accordance with the location control weights;

generating updated network parameters based on the state vector as weighted; and applying the updated network parameters to the access points.

17. The medium of claim 16, where the initial network parameters indicate that one of the plurality of access points has becomes an inoperative access point, and the updated network parameters include to increase service area of at least a portion of the plurality of access points that are still operative to cover the area formerly covered by the inoperative access point.

18. The medium of claim 16, where the initial network parameters indicate an addition of a new access point to the plurality of access points, and the updated network parameters include to decrease service area of at least a portion of the plurality of access points to allow the new access point to take control of a portion of area located around the new access point.

* * * * *